(12) United States Patent
Zhang

(10) Patent No.: US 8,590,371 B2
(45) Date of Patent: *Nov. 26, 2013

(54) TIRE VALVE FOR VEHICLES

(75) Inventor: Jianer Zhang, Hangzhou (CN)

(73) Assignees: Hangzhou Hamaton Tyre Valves Co., Ltd., Hangzhou, Zhejiang Province (CN); Jianer Zhang, Hangzhou, Zhejiang Province (CN)

( * ) Notice: Subject to any disclaimer, the term of this patent is extended or adjusted under 35 U.S.C. 154(b) by 254 days.

This patent is subject to a terminal disclaimer.

(21) Appl. No.: 13/127,271

(22) PCT Filed: May 19, 2009

(86) PCT No.: PCT/CN2009/071851
§ 371 (c)(1),
(2), (4) Date: May 3, 2011

(87) PCT Pub. No.: WO2010/054548
PCT Pub. Date: May 20, 2010

(65) Prior Publication Data
US 2011/0209537 A1    Sep. 1, 2011

(30) Foreign Application Priority Data
Nov. 17, 2008    (CN) .......................... 2008 1 0122300

(51) Int. Cl.
*B60C 23/02*    (2006.01)

(52) U.S. Cl.
USPC .............................................. 73/146.8; 73/146

(58) Field of Classification Search
None
See application file for complete search history.

(56) References Cited

U.S. PATENT DOCUMENTS

| | | | |
|---|---|---|---|
| 6,568,259 B2 * | 5/2003 | Saheki et al. | 73/146 |
| 7,107,830 B1 * | 9/2006 | Yu et al. | 73/146.4 |
| 7,469,581 B2 * | 12/2008 | Katou et al. | 73/146.8 |
| 7,669,466 B2 * | 3/2010 | Ray et al. | 73/146.8 |
| 7,775,095 B2 * | 8/2010 | Yu | 73/146 |
| 2006/0125612 A1 * | 6/2006 | Okubo et al. | 340/445 |

* cited by examiner

*Primary Examiner* — Lisa Caputo
*Assistant Examiner* — Jermaine Jenkins
(74) *Attorney, Agent, or Firm* — Jacobson Holman PLLC; Jiwen Chen

(57) ABSTRACT

A tire valve for a vehicle comprises a metal housing (1) and an elastic housing (2) around the metal housing (1). The metal housing (1) has a cylindrical portion (13) corresponding to a rim opening (201). The metal housing (1) has an annular flange (6) above the cylindrical portion (13), and has an annular lower flange (12) under the cylindrical portion (13). The elastic housing (2) has a cylindrical elastic portion (21) around cylindrical portion (13), and has a tapered portion (22) around the annular flange (6). The lower end of the elastic housing (2) is placed around the annular lower flange (12).

8 Claims, 5 Drawing Sheets

TIRE VALVE FOR VEHICLES

This is a U.S. national stage application of PCT Application No. PCT/CN/2009/071851 under 35 U.S.C. 371, filed May 19, 2009 and published in Chinese, claiming the priority benefit of Chinese Application No. 200810122300.1, filed Nov. 17, 2008, which is hereby incorporated by reference.

FIELD OF THE INVENTION

The present invention relates to a valve for a vehicle tire.

BACKGROUND OF THE INVENTION

An auto tire valve comprises a metal body and an elastic housing around the metal body. The head thread of the metal body connects to a protective cap, and the valve core is mounted inside the metal body. The valve is mounted on a rim with its tail inside the tire. According to the technical requirements of the valve being mounted on the rim, three strain indexes are the major consideration: pull-in force is not higher than a certain upper limit value during the mounting stage while retreating force and pull-out force are not lower than a certain lower limit value after the mounting. At present, it is required for some of the vehicles to monitor the tire pressure in driving; consequently an electronic box of a tire pressure monitoring system, mounted inside the tire, is connected to the valve tail for real-time examination. However, as the electronic box increases the weight of the valve tail by a wide margin, which completely changes the valve strain conditions when tires are running at a high speed. So it is difficult for the valve structure to meet both requirements of the retreating force and the pull-out force.

SUMMARY OF THE INVENTION

It is thus the object of the present invention to provide an auto tire valve which can be pulled in easily to be mounted on the rim with a sufficient retreating force and ensure it is still secure when tires are rotating at a high speed. Therefore the invention adopts the following technical schemes: said metal body has a first cylindrical portion corresponding to a rim opening, an annular flange to enlarge retreating force for the valve above the first cylindrical portion, and an lower annular flange corresponding to the lower end of the elastic body under the cylindrical portion; and said elastic body has a first cylindrical elastic portion around the first cylindrical portion, a tapered portion around the annular flange to enlarge retreating force, with the lower end of the elastic body placed around the lower annular flange; and the outer diameter of the first cylindrical portion is 5.9~6.5 mm and the one of the annular flange to enlarge retreating force is 8.6~9.2 mm with the difference between the outer diameter of annular flange and the first cylindrical portion over 2.7 mm; and the maximum outer diameter of the tapered portion of the elastic body is 13.8~14.2 mm and the outer diameter of the first cylindrical elastic portion is 13~13.5 mm. By using the above technical schemes, the invention is able to use the annular flange and its dimensions to ensure that the valve possesses the required pull-in force, retreating force and pull-out force. Therefore the valve can be pulled in easily to be mounted on the rim and ensure to be still mounted securely after the mounting of the electronic box of the tire pressure monitoring system when tires are rotating at a high speed.

DESCRIPTION OF THE PREFERRED EMBODIMENT

Figure 1:
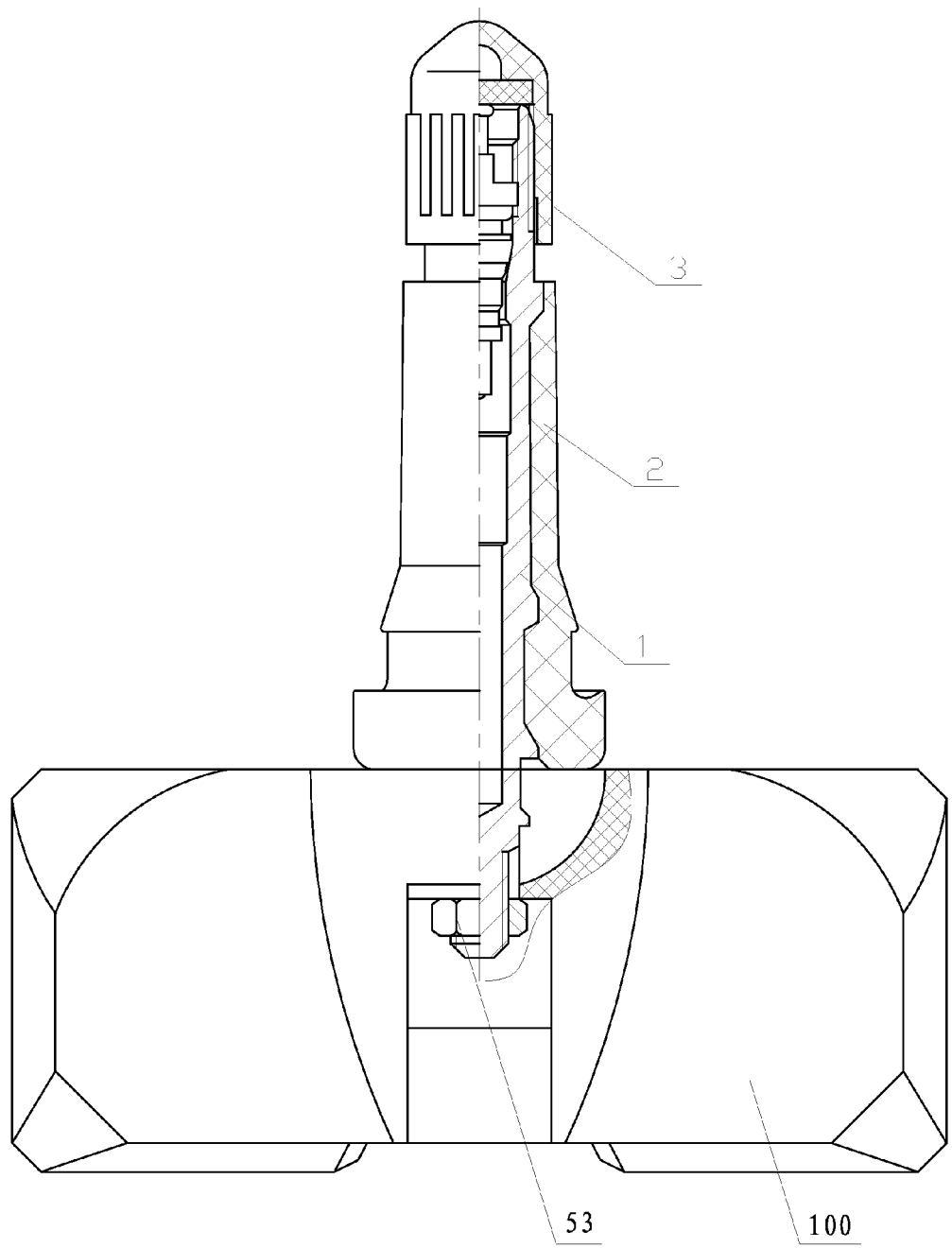
FIG. 1 shows the connection diagram between the provided embodiment and the electronic box of the tire pressure monitoring system.
Figure 3:
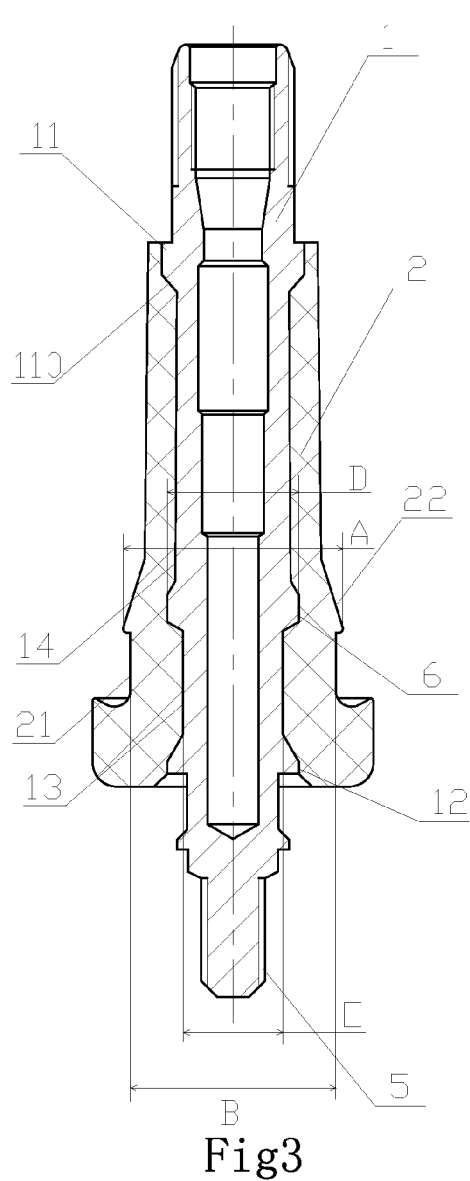
FIG. 3 shows the section diagram of the embodiment without the protective cap in FIG. 1.
Figure 2:
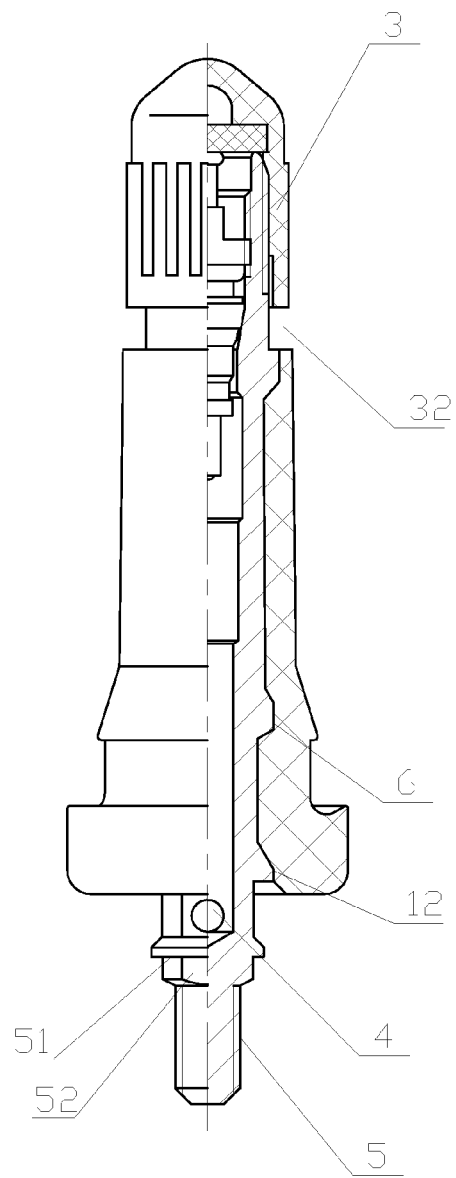
FIG. 2 shows the half section diagram of the embodiment in FIG. 1.
Figure 4:
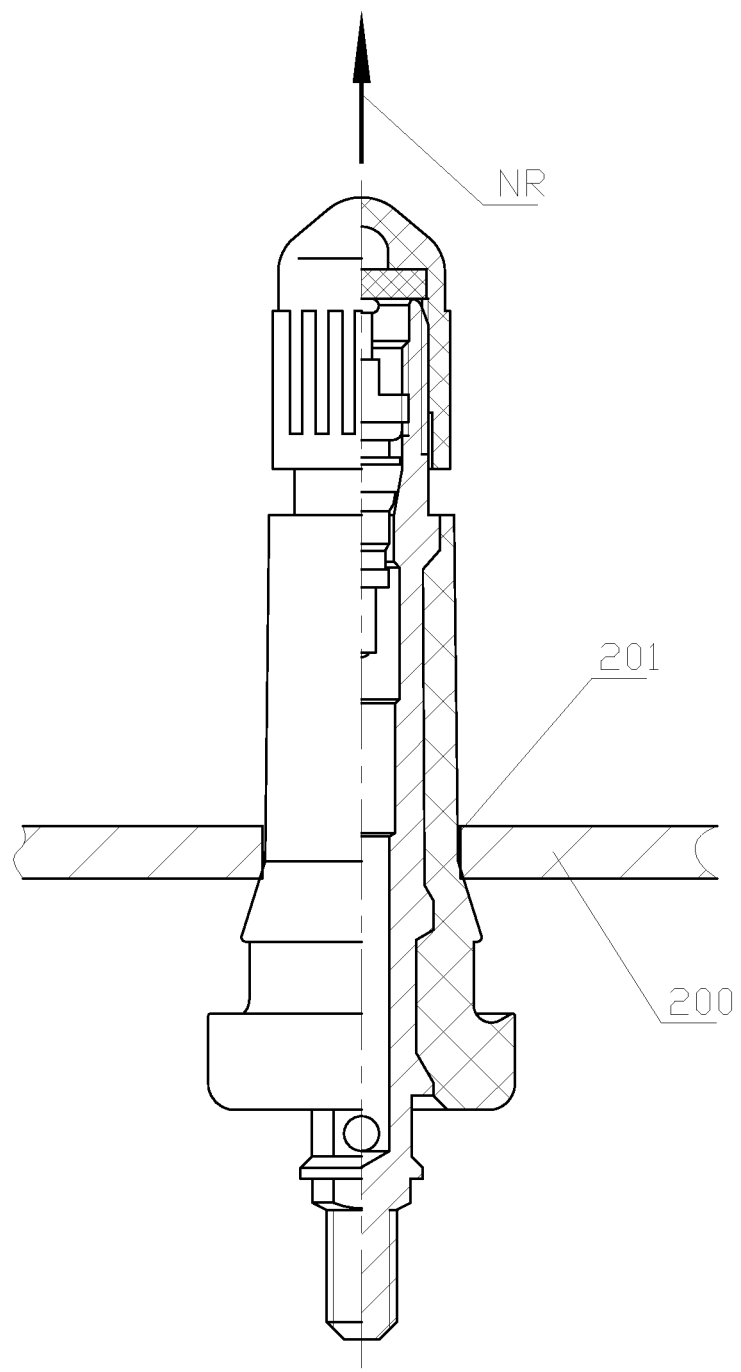
FIG. 4 shows the direction and state of the pull-in force. Label NR denotes the pull-in force direction.
Figure 5:
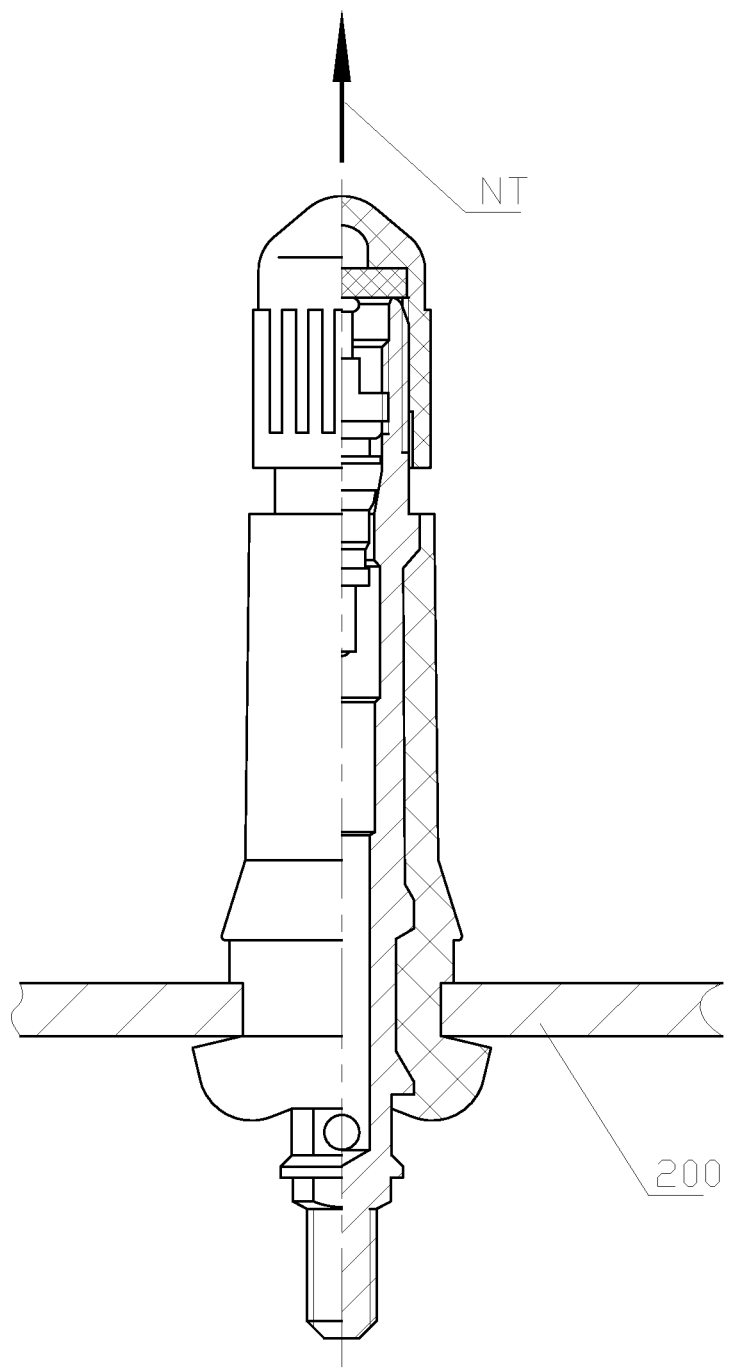
FIG. 5 shows the direction and state of the pull-out force. Label NT denotes the pull-out force direction.
Figure 6:
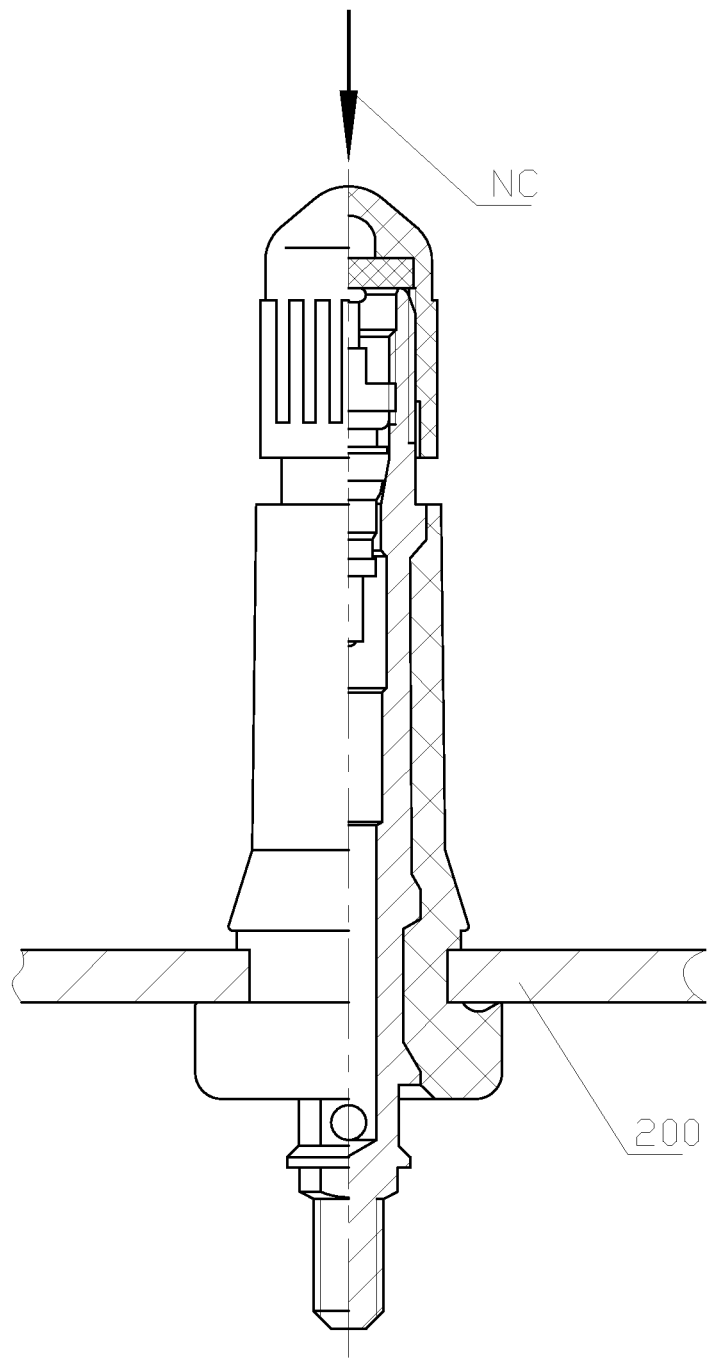
FIG. 6 shows the direction and state of the retreating force. Label NC denotes the retreating force direction.

Referring to the figures, the present invention comprises a valve metal body 1 and an elastic body 2 around the metal body 1. The elastic body 2 may use vulcanized rubber with hardness at 75A. The metal body 1 has a first cylindrical portion 13 corresponding to a rim opening 201. The metal body 1 has an annular flange 6 to enlarge retreating force for the valve above the first cylindrical portion, and a lower annular flange 12 corresponding to the lower end of the elastic body under the cylindrical portion. The elastic body 2 has a first cylindrical elastic portion 21 around the first cylindrical portion, and has a tapered portion 22 around the annular flange to enlarge retreating force. The lower end of the elastic body is placed around the lower annular flange. The lower annular flange 12 ensures not only the air tightness between the elastic body and the metal body but also rubber vulcanization positioning of the elastic body 2. The outer diameter E of the first cylindrical portion is 5.9~6.5 mm and the outer diameter D of the annular flange to enlarge retreating force is 8.6~9.2 mm; the difference between the outer diameter D of the annular flange to enlarge retreating force and the outer diameter E of the first cylindrical portion is over 2.7 mm. The maximum outer diameter A of the tapered portion of the elastic body 22 is 13.8~14.2 mm, and the outer diameter B of the first cylindrical elastic portion is 13~13.5 mm. The rim in the figure is numbered 200. The diameter of the rim opening 201 is 11.5±0.2 mm.

As shown in the figures, the upside and downside of the annular flange to enlarge retreating force 6 are bevel and the jump of the downside is larger than the upside. In other words, the difference between the maximum diameter of the annular flange to enlarge retreating force 6 and the diameter of the first cylindrical portion 13 is larger than the difference between the maximum diameter of the annular flange 6 and the diameter of the metal body cylindrical portion 14. This makes the valve easy to meet the requirements of both ejection force and pull-in force.

The metal body 1 has an air introducing and discharging hole 4. The metal body has an external threaded stem 5 used to connect the electronic box 100 of the tire pressure monitoring system at the end; the air introducing and discharging hole 4 is placed on the upside of the external screw thread stem. This invention uses the external screw thread to achieve the installation of the electronic box of the tire pressure monitoring system. Compared with internal thread, it facilitates different ways to reinforce the connection strength, for example, the way covering the external threaded stem with the connection structure of the electronic box and place the connection structure against the step or extended plane of the metal body and using multiple nuts and external threaded stem to lock the connection structure to make sure the electronic box of the tire pressure monitoring system and the valve are securely locked when the vehicle is running at a high speed. Label 53 denotes the securing nut matched with the external threaded stem 5.

The metal body has a limit step 51 for the electronic box between the external threaded stem and the air introducing and discharging hole. The metal body has an anti-rotation plane 52 between the electronic box limit step and the external threaded stem to further prevent the electronic box 100 from loosing.

A head thread of the metal body connects to a protective cap 3. A gap is left between the upper side of the elastic body and the protective cap to form a space 32 for inserting the tool which mounts the valve on the rim. Therefore during the installation, it is not necessary to use great effort to clip the valve, but only required to insert the tool between the upper side of the elastic body and the protective cap and pull up the valve to make it matching with the downside of the protective cap to be pulled, and mounted in the rim opening conveniently.

The metal body 1 of the valve has an upper annular step 11 corresponding to the upper side of the elastic body to facilitate rubber vulcanization positioning of the elastic body 2. The downside 110 of the lower annular step is a slope.

To meet the requirement of the retreating force and the pull-in/pull-out force is a pair of contradictory body. Connecting the end of the metal body with the electronic box 100 of the tire pressure monitoring system makes the contradictory change qualitatively. A significant amount of research during the manufacture of this invention prove that it is difficult to solve above problem without setting the annular flange 6 to enlarge retreating force. However, even if the annular flange 6 is set, the diameter of the annular flange 6, the diameter of the elastic body around the annular flange 6, the diameter of the first cylindrical portion 13 and the diameter of the elastic body around the first cylindrical portion 13 still restraint each other, which makes the choice difficult. After a large quantity of experiments, it is concluded in this invention that within the scope of the following numerical value, the valve connecting with the electronic box 100 of the tire pressure monitoring system is able to obtain the ideal retreating force, pull-out force and pull-in force at the same time: the outer diameter E of the first cylindrical portion is 5.9~6.5 mm, the outer diameter D of the annual flange is 8.6~9.2 mm and the difference between the outer diameter D of the annular flange and the outer diameter E of the first cylindrical portion is 2.7 mm; the maximum outer diameter A of the tapered portion is 13.8~14.2 mm and the outer diameter B of the first cylindrical elastic portion is 13~13.5 mm and the rubber hardness of the elastic member is 75A.

The table below shows part of the test data of 10 valves in a group:

| Groups | Outer diameter A (mm) | Outer diameter B (mm) | Outer diameter D (mm) | Outer diameter E (mm) | Average pull-in force (N) | Average pull-out force (N) | Average retreating force (N) |
|---|---|---|---|---|---|---|---|
| 1 | 13.7 | 12.9 | 8.5 | 5.8 | 296 | 578 | 850 |
| 2 | 13.8 | 12.7 | 8.2 | 5.7 | 299 | 522 | 791 |
| 3 | 13.6 | 13.0 | 8.3 | 5.6 | 287 | 537 | 818 |
| 4 | 13.8 | 13.0 | 8.6 | 5.9 | 352 | 615 | 920 |
| 5 | 14.2 | 13.5 | 9.2 | 5.9 | 378 | 754 | 998 |
| 6 | 13.9 | 13.1 | 9.1 | 6.0 | 360 | 635 | 940 |
| 7 | 14.0 | 13.2 | 9.0 | 6.1 | 370 | 687 | 955 |
| 8 | 14.1 | 13.3 | 8.9 | 6.2 | 363 | 722 | 961 |
| 9 | 14.0 | 13.4 | 9.0 | 6.3 | 368 | 783 | 943 |
| 10 | 13.9 | 13.2 | 9.0 | 6.4 | 358 | 711 | 901 |
| 11 | 13.8 | 13.5 | 9.2 | 6.5 | 348 | 830 | 920 |
| 12 | 14.2 | 13.5 | 9.2 | 6.5 | 381 | 839 | 1014 |
| 13 | 14.3 | 13.3 | 9.3 | 6.6 | 462 | 850 | 1020 |
| 14 | 13.7 | 12.9 | 9.3 | 6.7 | 445 | 770 | 870 |
| 15 | 14.2 | 13.0 | 9.3 | 6.5 | 453 | 750 | 980 |

In the table, the standard is met when the average pull-in force is smaller than 450N, average pull-out force is larger than 600N and average retreating force is larger than 900N.

The invention claimed is:

1. A tire valve for a vehicle comprises a valve metal body and an elastic body around the metal body, wherein said metal body has a first cylindrical portion corresponding to a rim opening, an annular flange to enlarge retreating force for the valve above the first cylindrical portion, and an lower annular flange corresponding to the lower end of the elastic body under the cylindrical portion; and said elastic body has a first cylindrical elastic portion around the first cylindrical portion, a tapered portion around the annular flange to enlarge retreating force, with the lower end of the elastic body placed around the lower annular flange; and the outer diameter of the first cylindrical portion is 5.9~6.5 mm and the one of the annular flange to enlarge retreating force is 8.6~9.2 mm with the difference between the outer diameter of annular flange and the first cylindrical portion over 2.7 mm; and the maximum outer diameter of the tapered portion of the elastic body is 13.8~14.2 mm and the outer diameter of the first cylindrical elastic portion is 13~13.5 mm.

2. The tire valve for a vehicle according to claim 1, wherein the up and down sides of the said annular flange are bevel, with the jump of the downside is bigger than that of the upside.

3. The tire valve for a vehicle according to claim 1, wherein said metal body has an air introducing and discharging hole and an external threaded stem for connecting with the electronic box of the tire pressure monitoring system at the end, with said air introducing and discharging hole placed between the external threaded stem and the lower annular flange.

4. The tire valve for a vehicle according to claim 3, wherein said metal body has a limit step for the electronic box of the tire pressure monitoring system between the external threaded stem and the air introducing and discharging hole.

5. The tire valve for a vehicle according to claim 4, wherein said metal body has an anti-rotation plane between the electronic box limit step and the external threaded stem.

6. The tire valve for a vehicle according to claim 1, wherein the head thread of the metal body connects to a protective cap and a gap is left between the upper side of the said elastic body and the protective cap to form a space for inserting the tool which mounts the valve on the rim.

7. The tire valve for a vehicle according to claim 6, wherein said metal body of the valve has an annular step corresponding to the upper of the elastic body.

8. The tire valve for a vehicle according to claim 7, wherein the backside of said annular step is a slope.

* * * * *